March 15, 1932.   I. Q. GURNEE ET AL   1,849,571
MOLD FOR FORMING HARD RUBBER ARTICLES
Filed Feb. 25, 1930   2 Sheets-Sheet 1

Inventors
ISAAC Q. GURNEE
WARREN HOPPER
By Parker Cook
Attorney

March 15, 1932.   I. Q. GURNEE ET AL   1,849,571
MOLD FOR FORMING HARD RUBBER ARTICLES
Filed Feb. 25, 1930   2 Sheets-Sheet 2

Inventors
ISAAC Q. GURNEE
WARREN HOPPER
By Parker Cook
Attorney

Patented Mar. 15, 1932

1,849,571

UNITED STATES PATENT OFFICE

ISAAC Q. GURNEE, OF BUTLER, AND WARREN HOPPER, OF BLOOMINGDALE, NEW JERSEY, ASSIGNORS TO SUPERIOR HARD RUBBER COMPANY, OF BUTLER, NEW JERSEY, A CORPORATION OF NEW JERSEY

MOLD FOR FORMING HARD RUBBER ARTICLES

Application filed February 25, 1930. Serial No. 431,219.

Our invention relates to new and useful improvements in molds for molding hard rubber articles, and more especially to a mold adapted to mold clinical thermometer cases or articles of a similar nature.

As is well known to those skilled in the art, molds that are used in the manufacture of hard rubber goods must be exceedingly accurate and must retain this accuracy as, for instance, in molding thermometer cases if the threads vary as much as five-hundredths of an inch, the cap will not fit the thread nicely and the case may have to be rejected. As is also well known, there are two kinds of molds, one formed of a tin alloy and the other formed of a chromium steel or a steel coated with chromium, as ordinary steel would be affected by the sulphur in the rubber during the vulcanization.

The steel mold can be used a great number of times, but if the surface in any way becomes damaged by wear and use, it has to be either discarded or re-cut by a die maker and die making is very expensive.

Now the tin alloy molds are not nearly as expensive but due to the softness of the tin alloy, the molds may only be used a few times or about one day before they become bent or warped or inaccurate, and it is then necessary to recast them.

The present invention, therefore, contemplates the use of a tin alloy mold that is cast into a special form of malleable iron frame, so that the mold may be used for a goodly number of heats, and being bound in a malleable iron frame the tin alloy does not shrink from the frame and thus destroy its accuracy.

Still another object of the invention is to provide a mold consisting of a malleable iron frame wherein steel aligning pins are cast or forced within the iron frame, so that they really become an integral part of the frame and thereby will hold the two halves of the mold in proper alignment throughout the life of the tin alloy body, and after the mold, that is, the tin alloy becomes slightly deformed or inaccurate, it is but a simple matter to cast a new tin mold within the frame.

Still another object of the invention is to provide a mold wherein an edge tool may be easily placed within the two halves to separate the said parts, that is, between the "cope" and the "drag". Heretofore, iron molds have had lips or ears extending from their opposite ends and these ears break off when a plurality of the molds are put in the presses and greatly damage the plates of the presses.

Still another object of the invention is to provide a malleable iron frame with a tin alloy body and to provide means, so that the scum will remain at one end of the mold rather than passing over the matrix and, therefore, makes a better mold and much cleaner formed articles.

With these and other objects in view, the invention consists in certain new and novel arrangements and combination of parts, as will be hereinafter more fully described and pointed out in the claims.

Referring now to the drawings showing a preferred embodiment of our invention,

Referring now more particularly to the several views, there will be noticed a rectangular frame 1, which is preferably made of malleable iron, as this is tough without being brittle and will withstand the heat and pressure to which the same is to be subjected. As may be seen in the several figures, the top face of this frame is flat and is provided with a rectangular opening 2 through which the tin alloy will be poured to form the body of the mold. Also, there is shown the small openings 3, 4 and 5, so that the air may escape from the mold when the metal is being cast, and we frequently pour a small additional amount of metal in the small openings, so that even when the metal chills, the frame will be completely filled, as otherwise if the frame is not completely filled, the pressure is apt to leave a flaw in the finished soft metal which comes out of the press.

Figure 4:
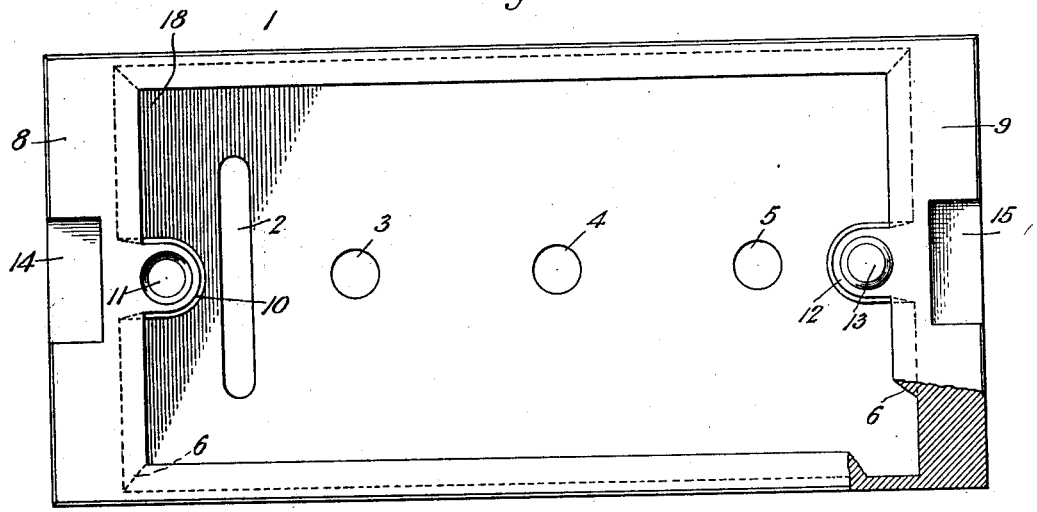
Fig. 4 is a top plan view of the malleable iron frame showing the sides and undercut edges for receiving the tin alloy to form the body of the mold.
Figure 5:
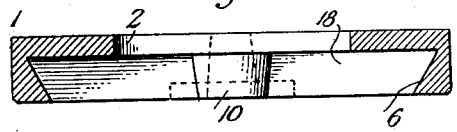
Fig. 5 is a cross sectional view taken on the line 5—5 of Fig. 1.

Referring to Fig. 4 for the moment, it will be seen that we provide the undercut edges, as at 6, around the inner portion of the frame, so that the tin alloy 7 will flow up within these undercut edges and thereby prevent the tin alloy from ever shrinking away from the frame. The depth of the frame is, in reality, about one inch and the top plate within the boundary of the undercut edges is generally about one-quarter of an inch thick.

The two ends of the frame 8 and 9 are wider across the top than the marginal side edges of the frame to provide sufficient strength, and it will be noticed that on one edge of the frame is the inwardly extending reinforced portion or lug 10 that is provided with a tapered opening 11, while at the other end of the frame and extending inwardly of the same is the lug 12 into which there may be cast or sweated a steel tapered aligning pin 13. This pin may be regular standard Morse taper, so that when the two halves of the mold, shortly to be explained, are aligned, these pins and openings will align the two halves of the mold absolutely accurately.

Figure 6:
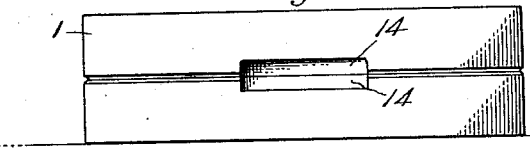
Fig. 6 is an end view showing how the malleable iron frame is cut to receive a chisel or other tool for separating the two parts of the die.

While still considering this malleable iron frame, it will be noticed that on the outer surface of the frame and directly opposite the opening 11 and the pin 13, there are formed the two recesses 14 and 15 which, when the two parts of the mold fit together, will appear as shown in Fig. 6 or, in other words, register.

There is a great advantage in this, as heretofore iron frames in which there is cast a soft metal body have been provided with outstanding lugs or ears rather than with recesses, and in sliding a plurality of these molds within a press, these ears at times break off and often so fall that when the plates of the press approach, they contact with one of these broken-up standing ears, and when the two thousand or more pounds pressure are exerted, these broken jaggered ears cut in and spoil the plates of the press, and the damage to both the press and the molds is a big material expense in the forming of hard rubber articles.

It will be seen that by providing these recesses rather than lugs at the opposite ends of the mold, there is nothing to break from the frame and there is a material saving in both the molds and the press.

Furthermore, by providing a tapered hole and a steel pin in these frames, the two parts of the mold may be separated and replaced a great number of times without the pins wearing and, therefore, the two parts of the mold will accurately register throughout a long period of use.

Figure 1:
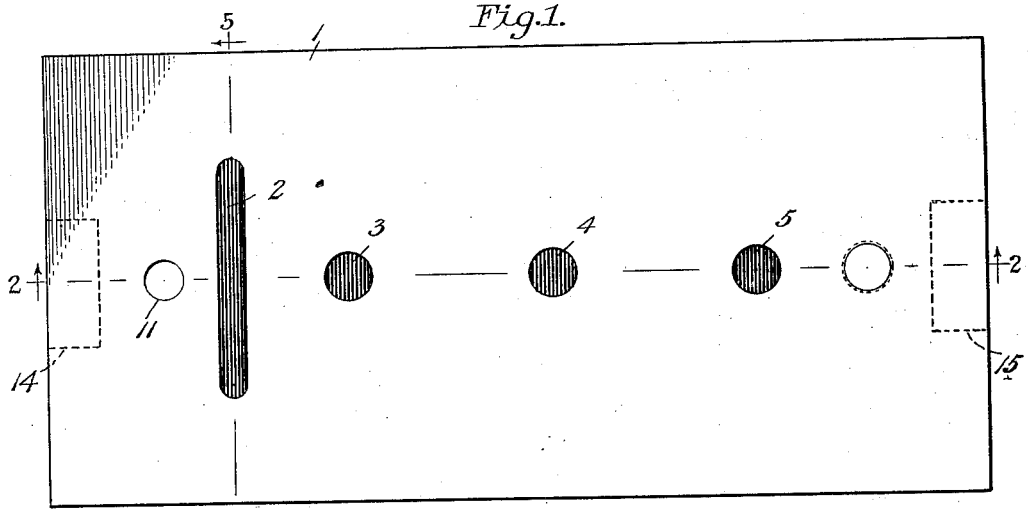
Fig. 1 is a top plan view of one of the sections of the mold showing the opening through which the tin alloy is poured as well as the air holes.
Figure 2:
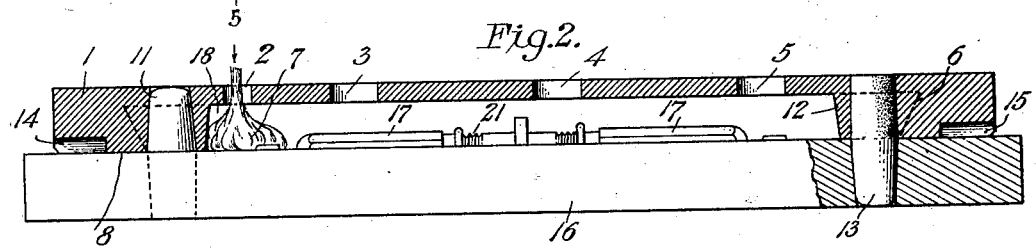
Fig. 2 is a sectional view on the line 2—2 of Fig. 1 showing the malleable frame ready to receive the pouring and also showing a matrix.

Referring for the moment to Fig. 2 showing the manner of forming the tin alloy bodies, there may be seen a matrix 16 and the shape of the article to be molded is cut out of steel, as at 17. In other words, a die maker will cut out this steel matrix, from which will be cast the tin alloy bodies within the malleable iron frames.

Figure 7:
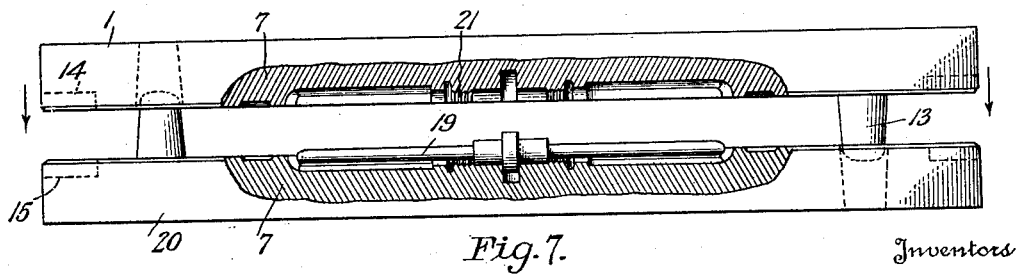
Fig. 7 is a side view of the mold with parts broken away and showing how the two parts will compress the rubber, the rubber being left out, however, for the sake of clearness of illustration.

In Fig. 2, I have shown the empty frame 1 set in position on the matrix and the tin alloy 7 may be seen passing through the opening 2. Here it is to be noticed that this opening 2 is near one end of the frame so that the scum or slag will tend to fill up the portion 18 before flowing over the projecting parts 17 of the matrix. The metal will then flow completely over the matrix, the air and bubbles passing out through the air holes 3, 4 and 5. The metal will entirely fill up the frame 1, flowing well within the undercut edges and the boundary walls of the frame and will even finally fill up the air holes 3, 4, and 5 and the opening 2. The tin alloy is then allowed to harden and the frame will be inverted from the position shown in Fig. 2, so that it will now appear as in Figs. 3 and 7.

Figure 3:
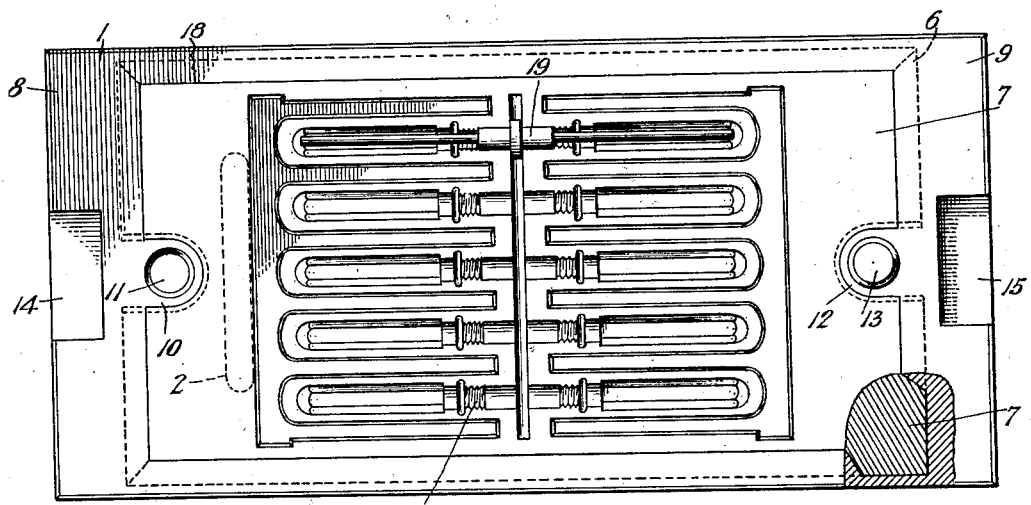
Fig. 3 is a view similar to Fig. 1 with the plate in its inverted position and showing one-half of the mold in its completed form with a small core in place for casting the thermometer caps.

In Fig. 3, we have additionally shown a small metal core 19 in position so as to form the hollow chamber within the clinical thermometer case to be cast. It will be understood that after the tin alloy has filled up the frame and the frame is placed in its inverted position, as shown in Fig. 3, the metal may be polished off, so that there will be a bright, flat surface and, in a like manner, the metal will have overflowed through the holes 3, 4 and 5 and the opening 2 will be scraped flat with the upper surface of the frame.

The lower half of the mold 20 (see Fig. 7) is made in identically the same manner, so that now we have the two halves of the mold or, as is spoken of in molding arts, the "cope" or, as is spoken of in molding arts, the "cope" and the "drag", the pin of one-half of the mold fitting within its receptive hole and the pin of the other half of the mold fitting in a like hole of the first-mentioned half. After these two molds are completed, the rubber that formed the cases will be placed between the two halves of the mold and the plates then set in position and placed in a press where they are subjected to the necessary pressure, heat and steam and for the desired amount of time.

To separate the parts, it is only necessary to pass a blunt-edged tool within the recesses 14 and 15 and wedge the upper plate loose, so that the same may be removed and the partly cured molded articles removed and the small metal core 19 also removed. The articles may then be again reheated and hardened in the usual manner.

As above stated, the small threads 21 must be very accurately cast, and we have found in actual practice that if these threads vary as much as five-hundredths of an inch, the cap (not shown) which fits on the clinical thermometer case will not thread nicely and truly, so it is necessary that these be made with the utmost care.

With the present malleable iron mold and steel pins with relatively large surfaces fitting within the tapered holes, we can use the molds for a hundred heats and the threads will be accurate within the above dimensions. After substantially this number of heats, it is but a matter of a few moments to melt the tin alloy within the frame and place it over the steel matrix and pour a new mold. It will also be seen that by providing malleable iron frames with the tin alloy insert, the frames may be compresed tightly without distorting the tin alloy, as is the case where simply a tin alloy mold is used. Again, it will be seen that by having the aligning pins made of steel rather than out of the tin alloy, which is the ordinary practice with the tin alloy mold, the molds may be used a number of days rather than just one day, as is the present practice.

Furthermore, there will be absolutely no shrinkage of the tin alloy away from the frame and the two parts of the mold will register so accurately that the threads on these thermometer cases will be accurate within the desired limits.

Finally, with these molds there are no ears or lugs to break off and, in actual practice, we have not damaged any of the plates of the press by using molds of this kind and, of course, there are no ears to break off to thus spoil the frame.

It will be understood that the opening 2, although shown as oblong in length, may be of any desired shape and, in fact, the plate might be cut out to form a relatively large opening rather than have the opening 2 and the air holes 3, 4 and 5, but by making these plates as shown, the tin alloy will always be of the same thickness throughout.

Also, by arranging the frames as shown, any scum will be kept at one end of the frame rather than run over the matrix to spoil the same.

Having thus described our invention, what we claim as new and desire to secure by Letters Patent is:

1. A mold for forming hard rubber articles comprising two like malleable iron frames, each of said frames comprising a plate with limiting walls thereabout, means for aligning and holding the two said frames, each of said plates provided with a relatively large transverse opening near one end and said plate also provided with holes spaced from said transverse opening, a soft metal alloy within the frame and having matrix depressions therein, the matrix depressions being substantially distant from said transverse opening.

2. A mold for forming hard rubber articles comprising two hard metal frames and means for holding the frames in alignment, each of said frames provided with a relatively soft insert having matrix depressions formed therein, each of said frames also initially having a transverse opening therein and a plurality of holes spaced from said transverse opening, the transverse opening being positioned in the frame near one end thereof and substantially distant from the said matrix depressions, no part of the said transverse opening being adjacent the matrix depressions.

In testimony whereof I hereunto affix my signature.

ISAAC Q. GURNEE.

In testimony whereof I hereunto affix my signature.

WARREN HOPPER.